United States Patent [19]

Friedow et al.

[11] Patent Number: 4,846,532
[45] Date of Patent: Jul. 11, 1989

[54] ANTI-LOCK BRAKE SYSTEM WITH TRACTION CONTROL

[75] Inventors: Michael Friedow, Tamm; Anton van Zanten, Ditzingen-Schoeckingen, both of Fed. Rep. of Germany

[73] Assignee: Robert Bosch GmbH, Stuttgart, Fed. Rep. of Germany

[21] Appl. No.: 284,580

[22] Filed: Dec. 15, 1988

[30] Foreign Application Priority Data

Jan. 14, 1988 [DE] Fed. Rep. of Germany ....... 3800854

[51] Int. Cl.$^4$ ............................ B60T 8/32; B60T 8/44; B60T 13/12; B60K 28/16
[52] U.S. Cl. ..................................... 303/110; 303/93; 303/116; 303/119
[58] Field of Search ................. 303/110, 93, 119, 113, 303/114, 115, 116, 10–12; 180/197, 244, 245; 188/181 A, 181 R

[56] References Cited

U.S. PATENT DOCUMENTS

| 4,509,802 | 4/1985 | Solleder et al. | 303/110 |
| 4,575,161 | 3/1986 | Vanzant et al. | 303/110 |
| 4,636,009 | 1/1987 | Tsuru et al. | 303/93 |
| 4,750,790 | 6/1988 | Klein | 303/110 X |
| 4,755,008 | 7/1988 | Imoto et al. | 303/110 |
| 4,778,225 | 10/1988 | Rudolph et al. | 303/93 X |
| 4,796,957 | 1/1989 | Wakata et al. | 303/116 |

FOREIGN PATENT DOCUMENTS 3137287 1/1984 Fed. Rep. of Germany .

Primary Examiner—Douglas C. Butler
Attorney, Agent, or Firm—Edwin E. Greigg

[57] ABSTRACT

A brake system having anti-lock and traction control, which includes a master brake cylinder that can be subjected to pressure from a brake pedal, with at least one brake line connected to corresponding wheel brake cylinders. A valve is incorporated into the respective brake line via which the wheel brake cylinder connected to this brake line can be connected via a return pump to the brake line. Upstream of the return pump, a pressure line is connected to branch off to a pressure chamber of a vacuum cell, and brake fluid can be supplied from the pressure chamber to the return pump via this pressure line to insure that the return pump is always supplied with fluid.

21 Claims, 2 Drawing Sheets

ANTI-LOCK BRAKE SYSTEM WITH TRACTION CONTROL

BACKGROUND OF THE INVENTION

The invention relates to a brake system for vehicles with anti-lock and traction control features.

During driving, such combined anti-lock and traction control devices can slow down a driven wheel exhibiting a tendency to skid by purposefully exerting pressure on its brake, to such an extent that the slip value of this driven wheel will not, or at least not significantly, exceed a maximum value that is compatible with both good road holding and effective utilization of torque. Preferably the return pump is used both for anti-lock control and for pumping the brake fluid for traction control.

Such a brake system is shown for instance in German Pat. No. 31 37 287. There, the auxiliary pressure source for the traction control substantially comprises a high-pressure reservoir, by way of which, when the traction control is actuated, brake fluid is carried to the return pump. However, in this brake system, not only do the brake circuits not remain closed, but the overall structure is very complicated.

OBJECT AND SUMMARY OF THE INVENTION

A brake system as set forth herein, contrarily, uses only a vacuum cell for supplying brake fluid to the return pump during traction control. The return pump is not embodied as a regenerating or self-priming pump. Because of the many throttle restrictions formed by fluid pressure lines and valves, aspiration via a suction pump would generate damaging negative pressures, which would promote the production of air bubbles (degassing) and vapor bubbles, which in turn, depending on the extent, worsens the performance of the brake system to a varying degree. Damage to the suction pump from cavitation would also be feared. Therefore, only a feed pump, rather than a suction pump, is used in the closed brake circuit.

In the switch position for traction control, the magnetic valve is switched to allow the passage of brake fluid through it. To build up brake pressure without the master brake cylinder, the return pump must now draw brake fluid from outside the actual brake circuit. According to the invention, this takes place from the pressure chamber of a vacuum cell, the brake fluid being supplied at low pressure to the pump. The brake circuit remains closed, however.

In order for the brake fluid to reach the feed pump at the low pressure, the pressure chamber must be acted upon by a piston It is within the scope of the invention that this piston is connected to a diaphragm in the vacuum cell that divides two chambers from one another. In the normal state, air is removed from both chambers via an appropriate valve by a negative pressure pump, or by a connection to an engine intake tube, and thus have a negative pressure One of these chambers can then be supplied with air via a suitable valve. This enlarges that chamber; that is, the diaphragm moves into the evacuated chamber. In this motion, it carries the piston along with it which enlarges the pressure chamber.

The motion of the piston is counteracted by a spring which may be embodied as either a compression or a tension spring, which determines in which chamber it will be disposed.

To prevent a slight overpressure in the other chamber which would counteract the work of the diaphragm, a check valve may also be provided there, by way of which air is also removed from that chamber to the extent required. Additionally, the reliable presence of a negative pressure can be assured via this "vacuum check valve" even if at that moment the negative pressure is not sufficiently well assured by the component that furnishes it.

The pressure chamber of the vacuum cell, as noted above, is connected to the return pump. However, a magnetic valve should be incorporated in this connection. In the first exemplary embodiment of the invention, this magnetic valve is embodied as a switchover valve. In a first switching position, the intake position, a connection is established with the outlet of the return pump. In a second switching position, it connects the pressure chamber to the inlet of the return pump. Thus, in this second switching position, brake fluid flows out of the pressure chamber to the return pump, and can be utilized to build up a brake pressure in the corresponding wheel brake cylinders. In the third switching position, contrarily, the pressure chamber is connected to the brake line. A pressure limiting valve or a component having a storage function intercepts impermissibly high pressures between the magnetic valves in the brake line and the switchover valve. In this exemplary embodiment, an additional volume of brake fluid required for the vacuum cell pressure chamber is supplied internally ia the master brake cylinder.

In the second exemplary embodiment shown, the valve in the line to the return pump is embodied as a simple shutoff valve, which either opens the passageway or closes it. Once again a pressure limiting valve prevents the production of impermissibly high pressures in the branch on the outlet side of the return pump.

The additional volume of brake fluid required in this exemplary embodiment is drawn externally from a suitable supply container.

The advantages of the invention reside particularly in the fact that the brake circuits remain closed during anti-lock control. The structure of the entire brake system is very simple and economical. The vacuum cell requires relatively little space and may be located arbitrarily in the engine compartment.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
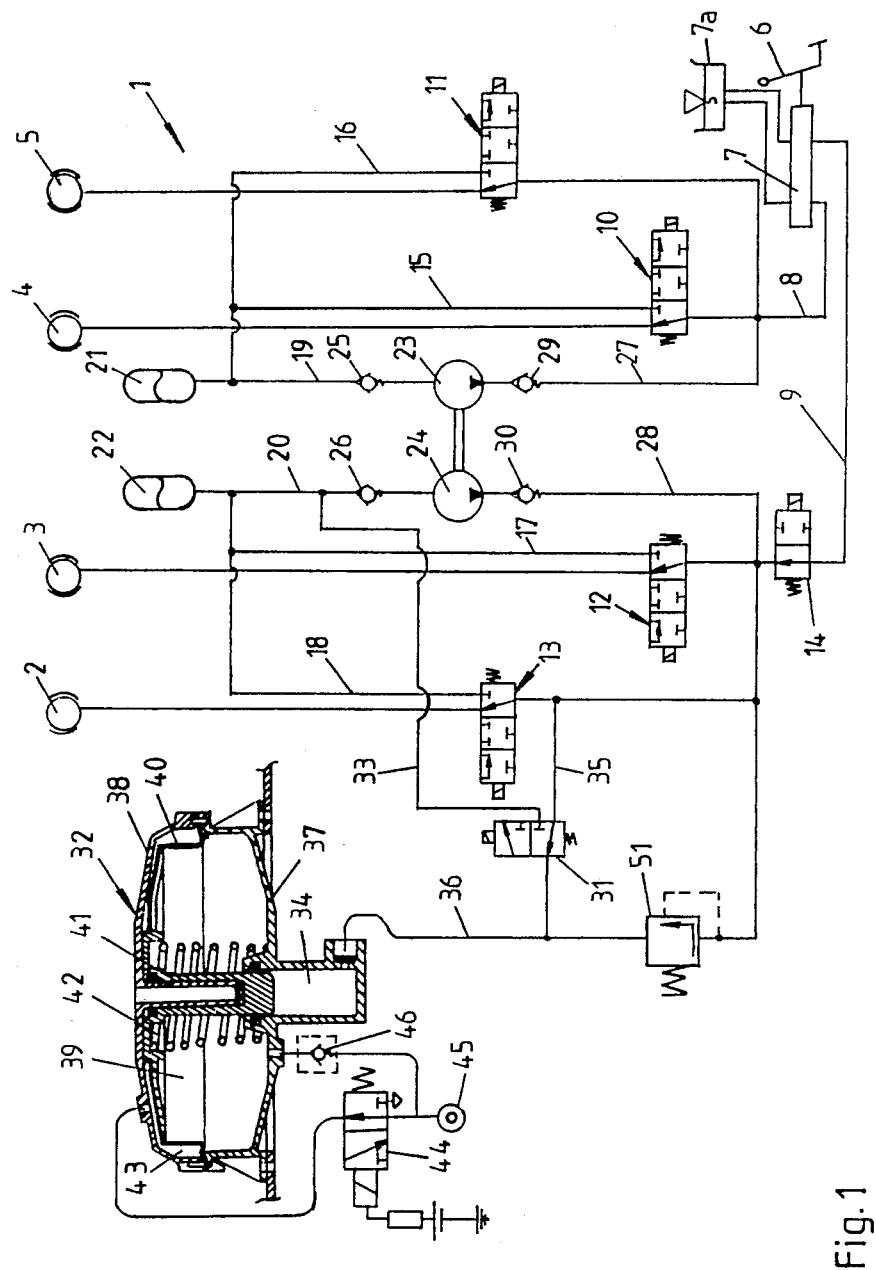
FIG. 1 is a block circuit diagram of a brake system according to the invention, with a pressure cell shown in cross section.

FIG. 1 shows a brake system 1 with a so-called black-and-white brake circuit arrangement. This brake system 1 has one brake circuit for the wheel brake cylinders of the rear wheels 2 and 3 and a separate brake circuit for the wheel brake cylinders of the front wheels 4 and 5.

Both brake circuits are assigned an anti-lock control means, while the brake circuit for the rear wheels, which in the present exemplary embodiment are the driven wheels, is also assigned a traction control means.

For determining the slip or tendency to lock, or skid, of a wheel, the various rear wheels 2 and 3 and front wheels 4 and 5 are assigned suitable well known wheel rpm sensors, not shown.

When a braking event is initiated brake pressure is transmitted via a brake pedal 6 to a master brake cylinder 7. In the present exemplary embodiment, this master brake cylinder 7 has two pressure chambers, with a respective brake line 8 and 9 connected thereto. The master brake cylinder 7 is also connected to a supply container 7a for brake fluid. The brake line 8 communicates via a 3/3-way magnetic valve 10 with the wheel brake cylinder of the front wheel 4, and also via a corresponding 3/3-way magnetic valve 11 with the wheel brake cylinder of the front wheel 5. The brake line 9 is connected to a shut-off valve 14 which is connected with corresponding 3/3-way magnetic valves 12 and 13 which communicate with the wheel brake cylinders of the rear wheels 2 and 3.

During a normal braking event this shutoff valve is open, so that brake fluid ca flow from the master brake cylinder 7 through the brake line 9 via the valve path of the shutoff valve 14, as well as via corresponding valve paths of the magnetic valves 12 and 13 which are open to reach the wheel brake cylinders of the rear wheels 2 and 3. The valve paths of the magnetic valves 10 and 11 are likewise open to the wheel brake cylinders of the front wheels 4 and 5 via line 8.

However, if a wheel rpm sensor detects locking or skidding of one of the wheels 2, 3, 4 or 5, then the magnetic valve 10, 11, 12 or 13 assigned to this wheel in its respective brake line 8 or 9 switches over into a shutoff position, which prevents fluid flow to or from the affected wheel, thus the wheel brake cylinders are uncoupled from the respective brake line 8 or 9. In that case the existing brake pressure in the wheel brake cylinders is held at the same level.

If the brake pressure present in the wheel brake cylinders is to be reduced, then the affected magnetic valve 10, 11, 12 or 13 switches over into its third switching position, in which it couples the wheel brake cylinders of the applicable wheel 2, 3, 4 or 5 with the appropriate return line 15, 16, 17 or 18. Return lines 15, 16 or 17, 18, are connected in pairs to discharge in common into one return line 19 o 20 between a respective pressure reservoir 21, 22 and a return pump 23, 24 upstream of a one-way check valve 25, 26. Via each return pump 23 or 24, the corresponding brake fluid is then pumped back into the respective brake line 8 or 9 upstream of the magnetic valves 10 11, 12, or 13, a further one-way check valve 29 or 30 being incorporated into the corresponding return line 27 or 28 which is connected to the brake line 8 or 9.

Thus, this present instance relates to closed brake circuits, into which brake fluid is neither supplied nor removed. For this reason, the return pumps 23 and 24 are not self-priming pumps; according to the invention, these pumps are also used for traction control. In that case, the shutoff valve 14 is connected to the brake line 9 between the master brake cylinder 7 and the wheel brake cylinders of the driven rear wheels 2 and 3. A 2/2-way magnetic valve 31 is connected to the pressure line 9 between the shut-off valve 14 and the 3/3-way valve 13 and also has a connection with the return line 20. As shown in FIG. 1, the magnetic valve 31 directs fluid from line 9 to a pressure chamber 34 of a vacuum cell 32 via line 36. The magnetic valve 31 switches into another switching position, not shown in FIG. 1, thus connecting the pressure chamber 34 of vacuum cell 32 to the return line 20 between the reservoir 22 and the one-way check valve 26 via pressure lines 33 and 36. Brake fluid in pressure chamber 34 can thus be fed out of the pressure chamber 34 of the vacuum cell 32 via the magnetic valve 31 and the pressure line 33 into the line 20 and is then present at the return pump 24. This brake fluid then flows into the brake line 9 via the return line 9 and reaches the wheel brake cylinders of the rear wheels 2 and 3 via the magnetic valves 12 and 13 in the switching position shown.

Once the traction control is ended, the magnetic valve 31 switches over, so that fluid via the return pump 24 now communicates via the return line 28 and a branch line 35, with the line segment 36 between the magnetic valve 31 and the pressure chamber 34 thereby refilling of the pressure chamber 34 of the vacuum cell 32. Thus, the present exemplary embodiment involves brake circuits that ar completely closed during both anti-lock control and traction control. Impermissibly high pressures in these lines are intercepted by a pressure limiting valve 51 connected to pressure line 9 and to the pressure chamber 34 of vacuum cell 32.

The pressure chamber 34 is part of a lower part 37 of the vacuum cell 32; this lower part 37, along with an upper part 38, encloses a chamber 39 in which a diaphragm 40 is located. A piston 41, by way of which the pressure chamber 34 can be subjected to pressure, is braced in the chamber 39 against this diaphragm 40. The piston 41 is kept in its fill position, shown, in which the pressure chamber 34 is filled with brake fluid, via a suitable helical spring 42 which forces the piston 41 away from pressure chamber 34. To make this filling process of the pressure chamber 34 self-priming, air must also be bled from the upper chamber 43, which is divided from the chamber 39 by the diaphragm 40. This is done via a further magnetic valve 44, which connects the chamber 43 to an engine intake tube 45 or to a negative pressure pump; in the present exemplary embodiment, the chamber 39 also communicates, via a one-way check valve 46, with the connection between the engine intake tube 45 and the magnetic valve 44. In traction control, this magnetic valve 44 is switched over, so that air can be supplied to the chamber 43. The negative pressure remaining in the chamber 39 then causes a motion of the diaphragm 40 toward chamber 34, which carries the piston 41 along with it and thus exerts pressure upon the brake fluid in the pressure chamber 34.

Figure 2:
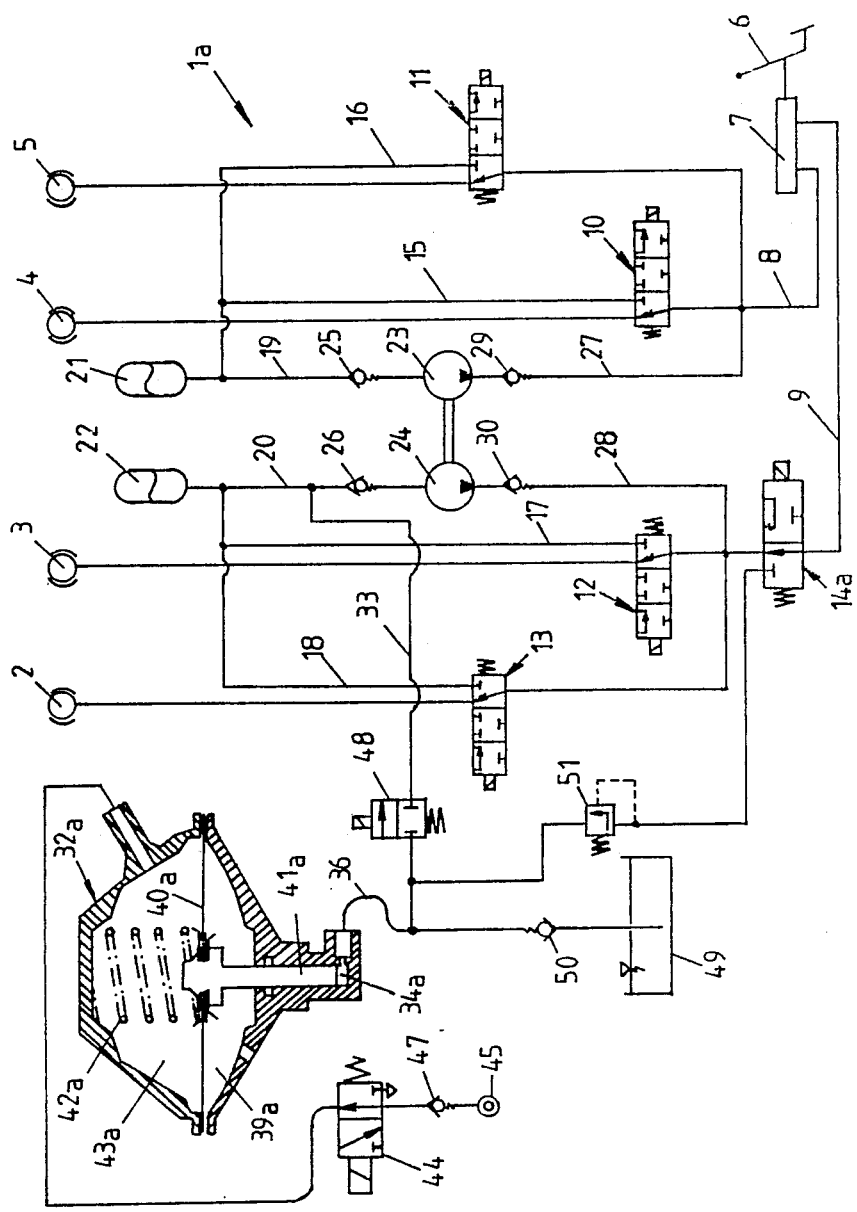
FIG. 2 shows a further exemplary embodiment of a brake system as in FIG. 1, with a pressure cell shown in cross section.

The exemplary embodiment of a brake system 1a, according to the invention shown in FIG. 2, differs from that shown in FIG. 1 primarily in terms of the embodiment of the vacuum cell 32a. The diaphragm 40a is in a middle position, in which the pressure chamber 34a is virtually completely evacuated. If the chamber 43a is then evacuated via the magnetic valve 44 and optionally a check valve 47 by the engine aspiration system, then the diaphragm 40a moves upward, counter to the pressure of the helical spring 42a, and carries the piston 41a along with it. At the same time, a magnetic valve 48 connected in pressure line 33 to the line 36 is in the position shown in FIG. 2. In this way, brake fluid is aspirated from a supply container 49 via a check valve 50.

During normal braking, the vacuum cell 32a is uncoupled from the brake line 9 by the valve 14a. This valve 14a is a 3/2-way valve, which selectively connects the outlet of the return pump 24 to the master brake cylinder 7 or the pressure chamber 34a. A pressure limiting valve 51 may be incorporated into the latter connection as well.

The foregoing relates to preferred exemplary embodiments of the invention it being understood that other variants and embodiments thereof are possible within the spirit and scope of the invention the latter being defined by the appended claims.

What is claimed and desired to be secured by Letters Patent of the United States is:

1. A brake system having anti-lock and traction control for vehicle having at least one pair of driven wheels which comprises a master brake cylinder subjectable to brake pressure by a brake pedal, at least one brake line from said master brake cylinder to corresponding wheel brake cylinders of said at least one pair of driven wheels, a control valve incorporated into said at least one brake line, a return line connected to said control valve via which said wheel brake cylinder connected to said at least one brake line is connectable to said at least one brake line upstream of said control valve, a fluid return pump in said return line, a first pressure line upstream of said return pump which branches off said return line to a pressure chamber of a vacuum cell, whereby said pressure line supplies brake fluid from said pressure chamber to said return pump.

2. A brake system as defined by claim 1, in which said pressure chamber is acted upon by a piston, which is connected to a diaphragm that divides off a first chamber from a second chamber in the vacuum cell.

3. A brake system as defined by claim 2, in which said first chamber communicates via a first magnetic control valve with a negative pressure means for generating a negative pressure in said first pressure chamber.

4. A brake system as defined by claim 3, in which said vacuum cell includes a spring that acts upon the piston to force said piston toward said pressure chamber.

5. A brake system as defined by claim 4, in which said spring that acts upon said piston (41) is provided in said second chamber of said vacuum cell.

6. A brake system as defined by claim 5, in which said second chamber of vacuum cell communicates via a check valve (46) with said negative pressure means.

7. A brake system as defined by claim 1, which includes a second magnetic valve incorporated into said pressure line that branches off from said return line to said pressure chamber of said vacuum cell.

8. A brake system as defined by claim 2, which includes a second magnetic valve incorporated into said pressure line that branches off from said return line to said pressure chamber of said vacuum cell.

9. A brake system as defined by claim 3, which includes a second magnetic valve incorporated into said pressure line that branches off from said return line to said pressure chamber of said vacuum cell.

10. A brake system as defined by claim 7, which includes a second pressure line connected from said at least one brake line upstream of said control valve to said second magnetic valve, said second magnetic valve (31), in a first switching position disconnects said pressure chamber of said vacuum cell from an inlet side of said return pump in said return line and in a second switching position, said pressure chamber is connected to said inlet side of said return pump disconnected from said second pressure line.

11. A brake system as defined by claim 10, which includes a shutoff valve in said at least one brake line upstream of said control valve and a connection of said return pump to said at least one brake line, said shutoff valve (14) in a first switching position opens a flow path for brake fluid from the master brake cylinder (7) to said control valve and to said pressure chamber of said vacuum cell and in a second switching position prevents flow of fluid in said at least one brake line to said control valve.

12. A brake system as defined by claim 7 in which said second magnetic valve, in a first switching position closes said first pressure line between said return pump and said pressure chamber of said vacuum cell and in a second switching position opens said first pressure line.

13. A brake system as defined by claim 12, in which an outlet (30) of the return pump communicates via second control valve and a pressure limiting valve with the pressure chamber of said vacuum cell.

14. A brake system as defined by claim 7, in which said pressure chamber has a connection with a supply container.

15. A brake system having anti-lock and traction control for a vehicle having at least one pair of front and back wheel with at least one pair of said wheels being driven wheels; which comprises, a master brake cylinder having first and second fluid pressure chambers subjectable to brake pressure by a brake pedal, first and second main brake lines connected to s id first and second fluid pressure chambers of said master brake cylinder one each brake line connected from said first main brake line to a wheel brake cylinder of each non-driven wheel, one each brake line connected from said second main brake line to wheel brake cylinders for each of said driven wheels, first, second, third, and fourth magnetic valves incorporated one each into each of said brake lines, a first return line connected to said first main brake line upstream of said first and second magnetic valves, a second return line connected to said second main brake line upstream of said third and fourth magnetic valves, a first return pump in said first return line, a second return pump in said second return line, an auxiliary return line connected from said first and second magnetic valve to said first return line upstream of said first return pump, an auxiliary return line connected from each of said third and fourth magnetic valves to said second return line upstream of said second return pump, a vacuum cell, a first pressure line that branches off from said second return line to a first pressure chamber of said vacuum cell whereby pressure line brake fluid can be supplied from the pressure chamber to the return pump.

16. A brake system as set forth in claim 15, which includes a fifth magnetic valve in said first pressure line to control fluid flow from said first pressure chamber to said second return line.

17. A brake system as set forth by claim 15, in which said vacuum cell includes a chamber, a diaphragm that divides said chamber into first and second pressure chambers a piston controlled by said diaphragm and operative relative to said first pressure chamber.

18. A brake system as set forth by claim 16, which includes a sixth magnetic valve in s id second main pressure line, said sixth magnetic valve controls fluid flow to said third and fourth magnetic valves and to said first pressure chamber in said vacuum cell.

19. A brake system as set forth in claim 18, in which said sixth magnetic valve supplies fluid to said fifth magnetic valve.

20. A brake system as set forth in claim 19 which includes a connection from said first pressure chamber to a brake fluid supply.

21. A brake system as set forth in claim 20, which includes a seventh magnetic valve, said seventh magnetic valve controlling air flow between said vacuum cell and a negative pressure means.

* * * * *